US010450880B2

(12) United States Patent
Banks et al.

(10) Patent No.: US 10,450,880 B2
(45) Date of Patent: Oct. 22, 2019

(54) AIR METERING BAFFLE ASSEMBLY

(71) Applicant: United Technologies Corporation, Farmington, CT (US)

(72) Inventors: Anton G. Banks, Manchester, CT (US); Leah M. Collins, Essex, CT (US); Gary J. Larson, Madison, CT (US); Thomas P. Dziuba, Northford, CT (US); Scott A. Kovach, Higganum, CT (US)

(73) Assignee: United Technologies Corporation, Farmington, CT (US)

( * ) Notice: Subject to any disclaimer, the term of this patent is extended or adjusted under 35 U.S.C. 154(b) by 445 days.

(21) Appl. No.: 15/228,573

(22) Filed: Aug. 4, 2016

(65) Prior Publication Data
US 2018/0038237 A1 Feb. 8, 2018

(51) Int. Cl.
| | |
|---|---|
| *F01D 9/06* | (2006.01) |
| *F01D 9/02* | (2006.01) |
| *F01D 25/00* | (2006.01) |
| *F02K 3/06* | (2006.01) |
| *F01D 5/18* | (2006.01) |

(52) U.S. Cl.
CPC ............. *F01D 9/065* (2013.01); *F01D 5/188* (2013.01); *F01D 5/189* (2013.01); *F01D 9/02* (2013.01); *F01D 25/005* (2013.01); *F02K 3/06* (2013.01); *F05D 2220/32* (2013.01); *F05D 2230/232* (2013.01); *F05D 2230/233* (2013.01); *F05D 2230/234* (2013.01); *F05D 2230/235* (2013.01); *F05D 2230/50* (2013.01); *F05D 2230/54* (2013.01); *F05D 2230/60* (2013.01); *F05D 2240/11* (2013.01); *F05D 2240/126* (2013.01); *F05D 2240/81* (2013.01); *Y02T 50/676* (2013.01)

(58) Field of Classification Search
CPC .......... F01D 9/065; F01D 9/023; F01D 5/188; F01D 5/189
See application file for complete search history.

(56) References Cited

U.S. PATENT DOCUMENTS

| | | | | |
|---|---|---|---|---|
| 3,301,527 | A | * | 1/1967 | Kercher .................. F01D 5/189 |
| | | | | 415/115 |
| 5,145,315 | A | * | 9/1992 | North ...................... F01D 5/189 |
| | | | | 29/889.722 |
| 5,630,700 | A | * | 5/1997 | Olsen ...................... F01D 5/189 |
| | | | | 415/134 |
| 5,634,766 | A | * | 6/1997 | Cunha ..................... F01D 5/187 |
| | | | | 415/115 |

(Continued)

FOREIGN PATENT DOCUMENTS

| | | |
|---|---|---|
| EP | 2625389 A1 | 8/2013 |
| WO | 2013162928 A1 | 10/2013 |
| WO | WO2016/089341 A1 | 6/2016 |

OTHER PUBLICATIONS

Extended European Search Report, for European Patent Application No. 17174037.6, dated Dec. 15, 2017, 9 pages.

*Primary Examiner* — Jason D Shanske
*Assistant Examiner* — Aye S Htay
(74) *Attorney, Agent, or Firm* — Kinney & Lange, P.A.

(57) ABSTRACT

A baffle assembly includes a collar with a port and a baffle positioned in the port. The baffle includes two ends, a hollow body, and a weld connecting the baffle to the collar, and the collar continuously surrounds the body of the baffle.

17 Claims, 7 Drawing Sheets

(56) References Cited

U.S. PATENT DOCUMENTS

| | | | | |
|---|---|---|---|---|
| 6,019,572 A * | 2/2000 | Cunha | ............... | F01D 5/187 |
| | | | | 415/114 |
| 6,543,993 B2 * | 4/2003 | Burdgick | ............... | F01D 5/188 |
| | | | | 415/114 |
| 7,819,628 B2 * | 10/2010 | Dervaux | ............... | F01D 5/18 |
| | | | | 415/115 |
| 8,152,468 B2 | 4/2012 | Propheter-Hinckley et al. | | |
| 8,292,573 B2 * | 10/2012 | Broomer | ............... | F01D 9/041 |
| | | | | 415/178 |
| 8,393,867 B2 * | 3/2013 | Chon | ............... | F01D 5/188 |
| | | | | 416/1 |
| 8,684,668 B1 | 4/2014 | Jones et al. | | |
| 2005/0135921 A1 * | 6/2005 | Busch | ............... | F01D 5/189 |
| | | | | 415/115 |
| 2006/0010852 A1 * | 1/2006 | Gekht | ............... | B23K 15/0093 |
| | | | | 60/262 |
| 2008/0173624 A1 * | 7/2008 | Drechsler | ............... | B23P 6/007 |
| | | | | 219/125.1 |
| 2010/0129196 A1 * | 5/2010 | Johnston | ............... | F01D 5/188 |
| | | | | 415/115 |
| 2013/0309079 A1 * | 11/2013 | Allen | ............... | F01D 25/00 |
| | | | | 415/208.1 |
| 2016/0023275 A1 * | 1/2016 | Propheter-Hinckley | ............... | |
| | | | | B22F 3/1055 |
| | | | | 416/96 A |
| 2016/0097286 A1 * | 4/2016 | Tibbott | ............... | F01D 5/188 |
| | | | | 415/1 |

\* cited by examiner

AIR METERING BAFFLE ASSEMBLY

STATEMENT OF GOVERNMENT INTEREST

This invention was made with government support under Contract Nos. N0019-02-C-303 and N00019-02-C-3003 awarded by the United States Air Force. The government has certain rights in the invention.

BACKGROUND

The present invention relates generally to fluid metering baffles, and more particularly to a fluid metering baffle for a cooled component of a gas turbine engine.

There are a variety of known gas turbine engine configurations, including two-spool, high-bypass engines. Such an engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. A fan is also connected to the low pressure spool, forward of the low pressure compressor. The combustion system is disposed between the high pressure compressor and the high pressure turbine and receives compressed air from the compressors and fuel provided by a fuel injection system. A combustion process is carried out within the combustion system to produce high energy exhaust gases to produce thrust and turn the high and low pressure turbines, which drive their respective compressors and the fan to sustain the combustion process.

The high energy gases contain a substantial amount of thermal energy, which is transferred to the high and low pressure turbines. Therefore, certain components of the high and low pressure turbines are cooled using relatively cool air that is bled from the low pressure compressor and/or the high pressure compressor. This cooling air can be fed into various structures, for example, turbine airfoils. The cooling air can be metered in order to control its flow by attaching metering structures in the cooling air flowpath. These metering structures must be sealed properly in order to ensure proper metering, which adds cost and increases the time to manufacture the cooled structures.

SUMMARY

In one aspect, a baffle assembly includes a collar with a port and a baffle positioned in the port. The baffle includes two ends, a hollow body, and a weld connecting the baffle to the collar, and the collar continuously surrounds the body of the baffle.

In another aspect, a method of assembling a cooled component includes positioning a baffle in a port in a collar, wherein the collar continuously surrounds the baffle. The baffle is welded to the collar by an automated machine to form a baffle assembly. The baffle assembly is positioned in the cooled component and welded to the cooled component by an automated machine.

The present summary is provided only by way of example, and not limitation. Other aspects of the present disclosure will be appreciated in view of the entirety of the present disclosure, including the entire text, claims and accompanying figures.

Figure 1:
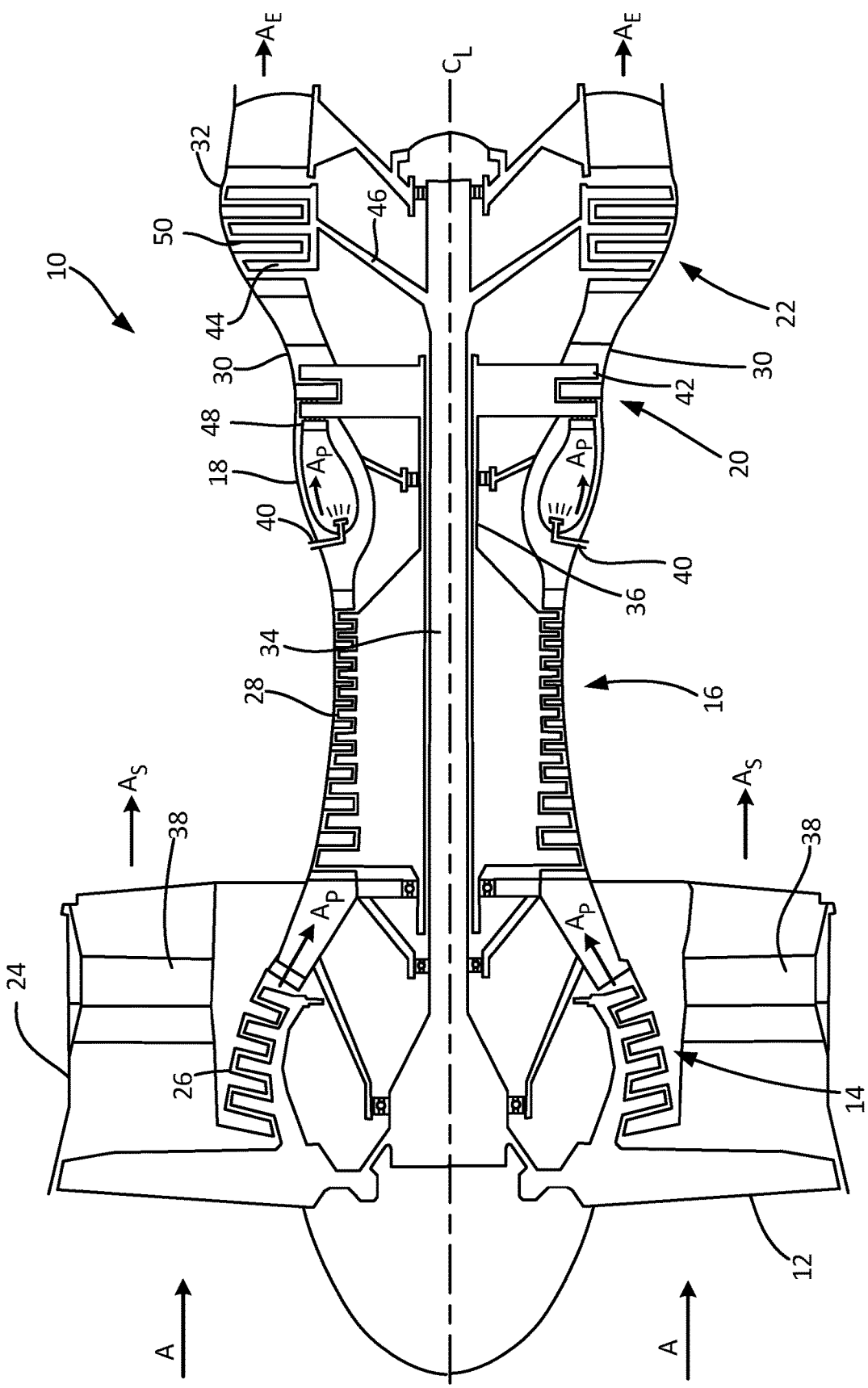
FIG. 1 is a schematic cross-sectional view of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

FIG. 1 is a schematic side cross-sectional view of gas turbine engine 10 for an aircraft (not shown). Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, fan exit guide vanes 38, fuel injectors 40, HPT blades 42, LPT blades 44, support rotor 46, HPT stators 48, LPT stators 50, inlet air A, exhaust air $A_E$, primary air $A_P$, secondary air $A_S$ (also known as bypass air), and longitudinal engine centerline axis $C_L$.

In the illustrated embodiment, gas turbine engine 10 comprises a dual-spool turbofan engine, although other engine configurations are possible in alternative embodiments. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly as shown or through a gearbox, not shown) to accelerate secondary air $A_S$ (also known as bypass air) through fan exit guide vanes 38, thereby producing a major portion of the thrust output of engine 10. Primary air $A_P$ (also known as gas path air) is directed first into LPC 14 and then into HPC 16. LPC 14 and HPC 16 work together to incrementally increase the pressure of primary air $A_P$. HPC 16 is rotated by HPT 20 through high pressure shaft 36 to provide primary air $A_P$ to combustor section 18. The compressed air is delivered to combustor section 18, along with fuel through fuel injectors 40, such that this fuel-air mixture is ignited by ignitors (not shown) thus resulting in a combustion process which can be carried out to produce the high energy gases necessary to turn HPT 20 and LPT 22. These high energy gases continue through gas turbine engine 10 whereby they are typically passed through an exhaust nozzle (not shown) to further produce thrust.

After being compressed in LPC 14 and HPC 16 and participating in a combustion process in combustor section 18 to increase pressure and energy, primary air $A_P$ is mixed with fuel in the combustor section 18. This fuel-air mixture is ignited by ignitors (not shown) and burned in the combustor section 18 producing exhaust air $A_E$. Exhaust air $A_E$ flows through HPT 20 and LPT 22 such that HPT blades 42 and LPT blades 44 extract energy from the flow of exhaust air $A_E$. Exhaust air $A_E$ impinges on HPT blades 42 to cause rotation of high pressure shaft 36, which turns HPC 16. Exhaust air $A_E$ also impinges on LPT blades 44 to cause rotation of support rotor 46 and low pressure shaft 34, which turns fan 12 and LPC 14. In order to straighten the flow of exhaust air $A_E$ through HPT 20 and LPT 22, HPT stators 48 and LPT stators 50 are interspersed between HPT blades 42 and LPT blades 44, respectively.

Figure 2A:
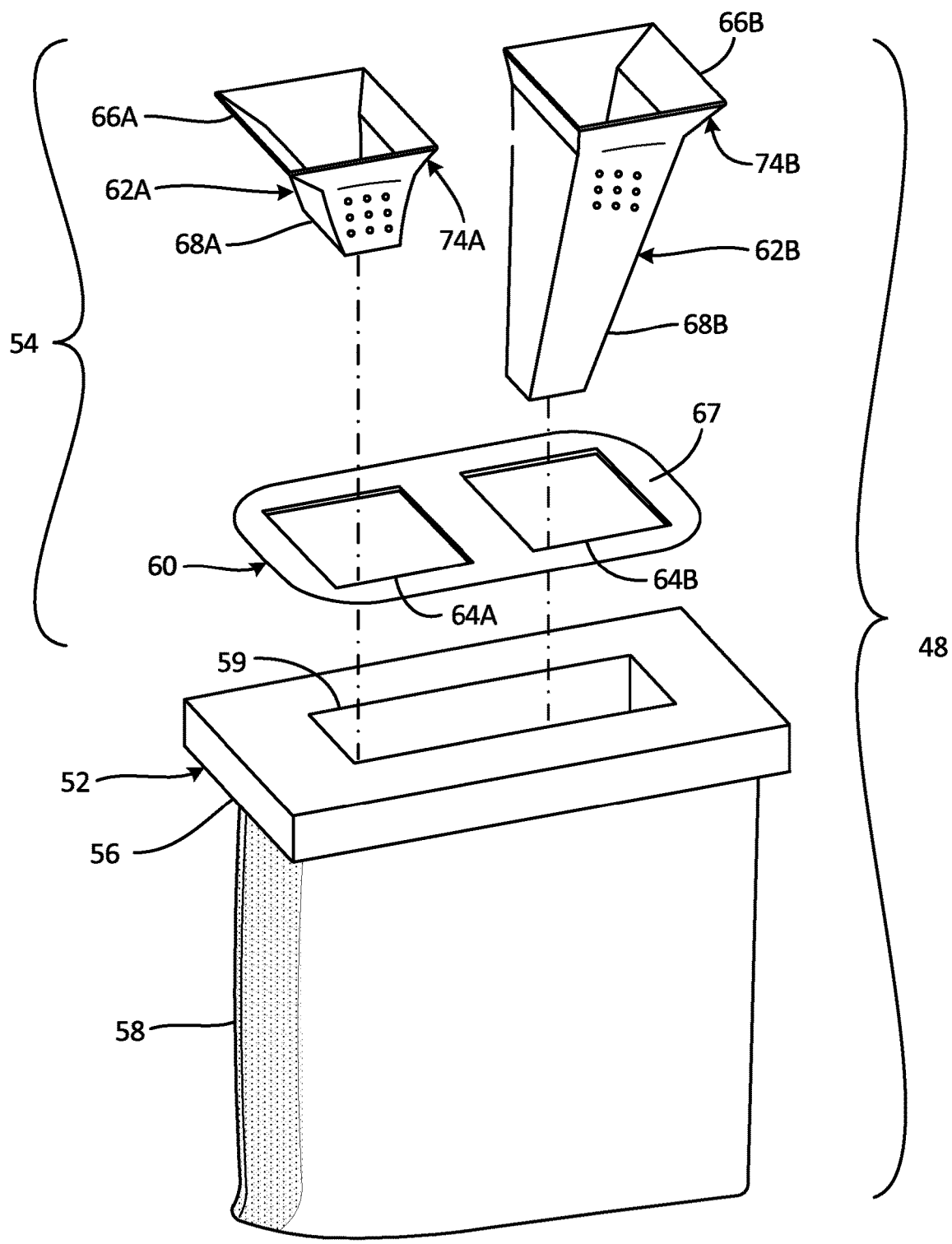
FIG. 2A is an exploded view of a stator including baffles, a collar, and a body.
Figure 2B:
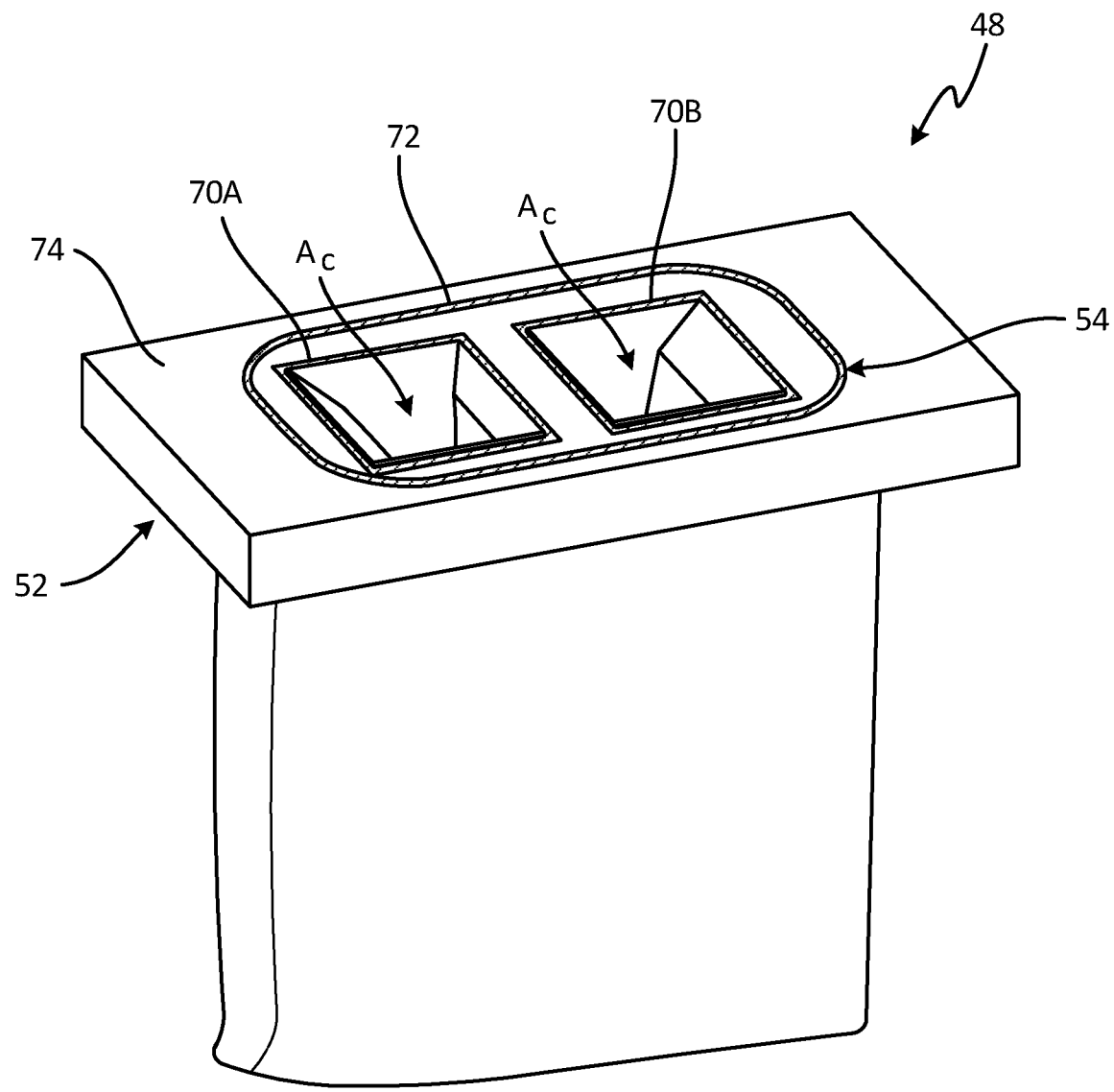
FIG. 2B is a perspective view of the stator of FIG. 2A when assembled.

During the operation of gas turbine engine 10, a portion of primary air $A_P$ can be bled off from at least one of LPC 14, HPC 16, and in between LPC 14 and HPC 16 for use as cooling air $A_C$ (shown in FIG. 2B). Cooling air $A_C$ is used for cooling components of HPT 20 and LPT 22, including HPT stators 48 and LPT stators 50. Therefore, HPT 20 and LPT 22 can operate at temperatures that are much higher than an uncooled turbine which increases the power and efficiency of gas turbine engine 10.

Depicted in FIG. 1 is one embodiment of the present invention, to which there are alternative embodiments. For example, engine 10 can be a three spool engine. In such an embodiment, engine 10 has an intermediate pressure compressor (IPC) between LPC 14 and HPC 16 and an intermediate pressure turbine (IPT) between HPT 20 and LPT 22, wherein the intermediate compressor is connected to the intermediate turbine with an additional intermediate shaft such that low pressure shaft, intermediate shaft and high pressure shaft are each concentrically and coaxially disposed around longitudinal engine centerline axis $C_L$.

FIG. 2A is an exploded view of HPT stator 48. HPT stator 48 is a cantilevered, cooled component that includes body 52 and baffle assembly 54. Body 52 includes platform 56 which is connected to HPT case 30 (shown in FIG. 1), and extending from platform 56 is airfoil 58, which acts upon exhaust air $A_E$ (shown in FIG. 1). Extending through platform 56 and into airfoil 58 is cavity 59. Cavity 59 is in fluid communication with a plurality of flow channels inside of body 52 (not shown) which are in fluid communication with a plurality of cooling holes extending through the exterior of airfoil 58. Thereby, cooling air $A_C$ is allowed to flow into, through, and out of HPT stator 48.

Baffle assembly 54 includes collar 60 and baffles 62A and 62B. Collar 60 is flat and includes ports 64A and 64B. Baffles 62A and 62B have elongate, hollow bodies that correspond to the shape of ports 64A and 64B and include swage portions 66A and 66B and metering portions 68A and 68B, respectively. Collar 60 and baffles 62A and 62B can be formed from sheet metal having a similar thickness and material in order to be conducive to welding. As shown in FIG. 2A, collar 60 and baffles 62A and 62B are formed of the same nickel alloy sheet material that is, for example, between 0.28 and 0.89 mm (0.011 and 0.035 in.) thick.

FIG. 2B is a perspective view of HPT stator 48 of FIG. 2A when assembled. More specifically, baffles 62A and 62B are positioned in ports 64A and 64B, respectively, and baffle assembly 54 is positioned in cavity 59 such that collar 60 is in contact with the outer side of platform 56. In the illustrated embodiment, ports 64A and 64B are continuously surrounded on all sides by collar 60. The flared outer ends of swage portions 66A and 66B are proximate to and larger than ports 64A and 64B, respectively, such that a small portion of swage portions 66A and 66B extend from outer side 67 of collar 60 when baffles 62A and 62B are positioned in ports 64A and 64B, respectively. These small portions can be, for example, between 0.38 and 0.76 mm (0.015 and 0.030 in.) in height. The remainder of swage portions 66A and 66B extend from the inner side of collar 60 (opposite of outer side 67, not shown) and then metering portions 68A and 68B extend from swage portions 66A and 66B, respectively, and are distal from collar 60. Metering portions 68A and 68B each include a plurality of metering holes for directing cooling air $A_C$ inside of body 52.

In the illustrated embodiment, baffles 62A and 62B are solely connected to collar 60 via baffle welds 70A and 70B, respectively, to form baffle assembly 54. The gaps that exist between collar 60 and baffles 62A and 62B are closed by melting the material from baffles 62A and 62B that extends from outer side 67 of collar 60. Thereby, collar 60 and baffle welds 70A and 70B continuously surround baffles 62A and 62B, respectively. In addition, baffle welds 70A and 70B can be substantially the same width all around a perimeter of each baffle 62A and 62B, respectively, and can penetrate completely through the joints, from outer side 67 to the inner side of collar 60 (not shown). Such construction creates an abrupt intersection between the inner side of collar 60 and outer surfaces 74A and 74B of baffles 62A and 62B, respectively.

Furthermore, baffle assembly 54 is solely connected to body 52 via collar weld 72. More specifically, baffle assembly 54 is welded to the outer side of platform 56. Collar weld 72 continuously surrounds collar 60, and collar weld 72 is substantially the same width all around the perimeter of collar 60. Furthermore, baffles 62A and 62B are cantilevered from collar 60 and are not directly connected to body 52.

The components and configuration of HPT stator 48 allows for a high angle transition between collar 60 and baffles 62A and 62B while permitting collar 60 to be continuous. This permits baffle welds 70A and 70B and collar weld 72 to be continuous and that prevents leakage of cooling air $A_C$ into cavity 59 (without first passing through one of baffles 62A and 62B). The uniform thickness and continuity of baffle welds 70A and 70B and collar weld 72 make the welding amenable to being performed by an automated or robotic machine.

Shown in FIGS. 2A and 2B are one embodiment of the present disclosure, to which there are alternatives. For example, baffle assembly 54 can be employed on another cooled structure, such as an LPT stator 50, an HPT blade 42 (shown in FIG. 1), an LPT blade 44 (shown in FIG. 1), or a blade outer air seal (BOAS) (not shown). For another example, swage portions 66A and 66B can be smaller than ports 64A and 64B, respectively. In such an embodiment, extra filler (not shown) would need to be provided in order to complete baffle welds 70A and 70B. In general, HPT stator 28 can vary from what is depicted in FIGS. 2A and 2B, for example, in the shape and number of the baffles, the locations of the metering holes, and the configuration of the collar and the ports.

Figure 3A:
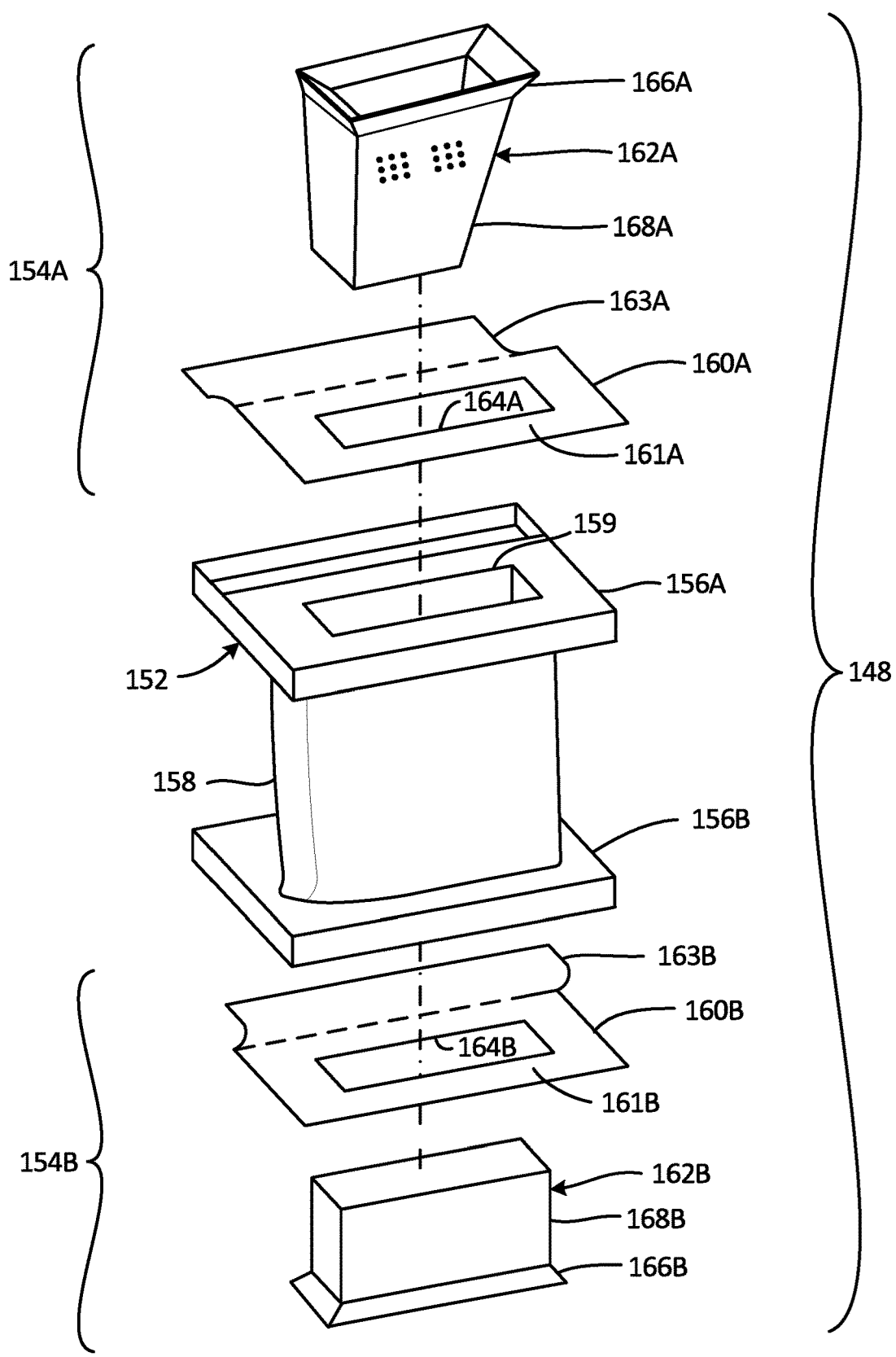
FIG. 3A is an exploded view of an alternate embodiment stator including baffles, coverplates, and a body.

FIG. 3A is an exploded view of an alternate embodiment HPT stator 148. HPT stator 148 is a fully supported, cooled component that includes body 152, outer baffle assembly 154A, and inner baffle assembly 154B. Body 152 includes outer platform 156A which is connected to HPT case 30 (shown in FIG. 1) and extending from outer platform 156A is airfoil 158, which acts upon exhaust air $A_E$ (shown in FIG. 1). At the opposite, inner end of airfoil 158 is inner platform 156B. Extending through platforms 156A and 156B and airfoil 158 is cavity 159. Cavity 159 is in fluid communication with a plurality of flow channels inside of body 152 (not shown) which are in fluid communication with a plurality of cooling holes extending through the exterior of airfoil 158. Thereby, cooling air AC is allowed to flow into, through, and out of HPT stator 148.

In the illustrated embodiment, outer baffle assembly 154A includes coverplate 160A and baffle 162A. Coverplate 160A is flat and includes an integral collar portion 161A with port 164A and an integral tab 163A extending from collar portion 161A. Baffle 162A has an elongate, hollow body that corresponds to the shape of port 164A and includes swage portion 166A and metering portion 168A. Coverplate 160A and baffle 162A are formed from sheet metal having a similar thickness and material in order to be conducive to welding. As shown in FIG. 3A, coverplate 160A and baffle 162A can be formed of the same nickel alloy sheet material that is, for example, between 0.28 and 0.89 mm (0.011 and 0.035 in.) thick.

Inner baffle assembly 154B is has substantially the same components and configuration as outer baffle assembly 154A, although inner baffle assembly 154B has been adapted to interface with inner platform 156B. More specifically, inner baffle assembly 154B includes coverplate 160B and baffle 162B. Coverplate 160B is flat and includes an integral collar portion 161B with port 164B and an integral tab 163B extending from collar portion 161B. Baffle 162B has an elongate, hollow body that corresponds to the shape of port 164B and includes swage portion 166B and metering portion 168B. Coverplate 160B and baffle 162B are formed from sheet metal having a similar thickness and material in order to be conducive to welding. As shown in FIG. 3A, coverplate 160B and baffle 162B are formed of the same nickel alloy sheet material that is, for example, between 0.28 and 0.89 mm (0.011 and 0.035 in.) thick.

Figure 3B:
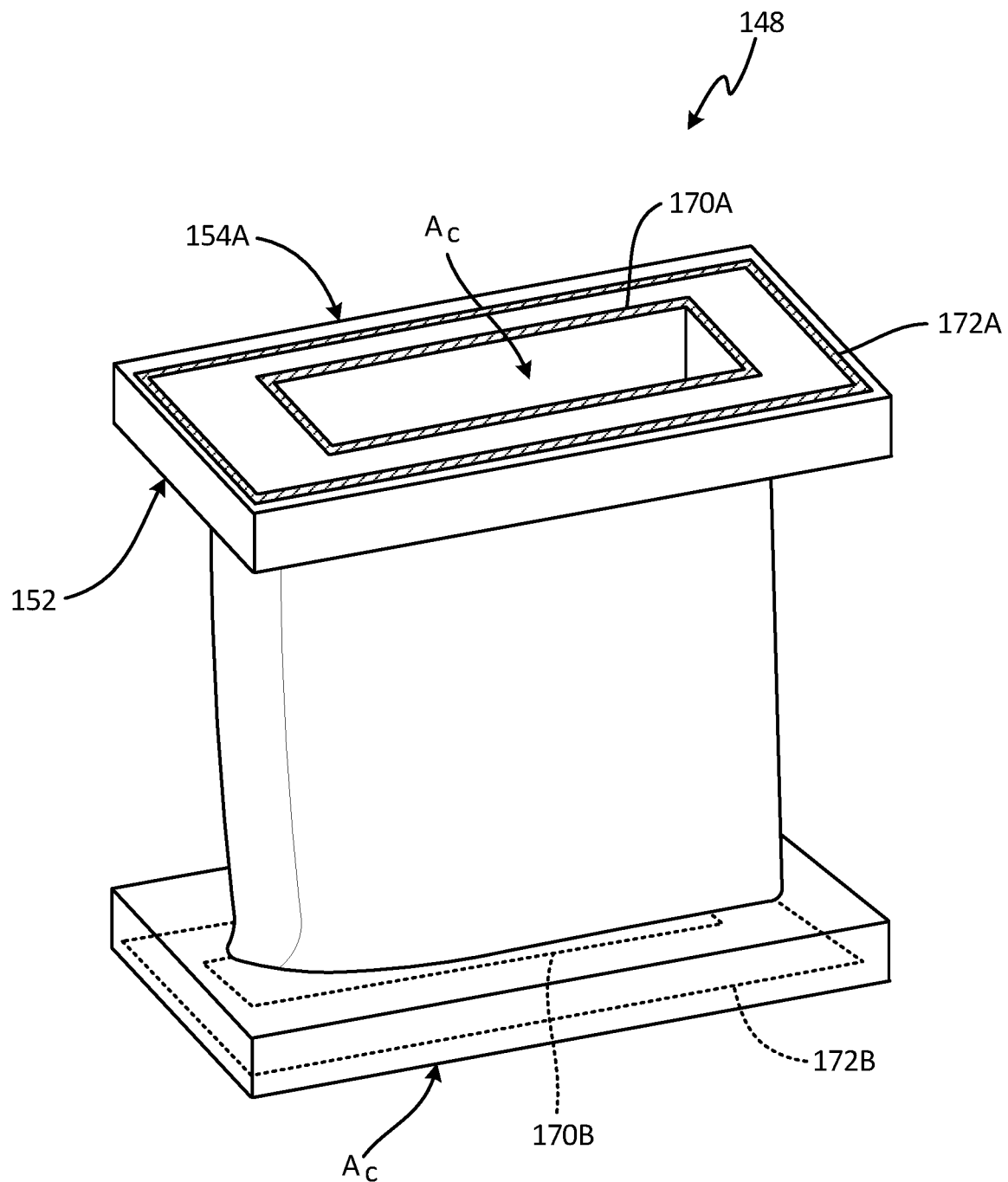
FIG. 3B is a perspective view of the alternate embodiment stator of FIG. 2A when assembled.

FIG. 3B is a perspective view of HPT stator 148 of FIG. 3A when assembled. More specifically, baffles 162A and 162B are positioned in ports 164A and 164B, respectively, and baffle assemblies 154A and 154B are positioned in opposite ends of cavity 159 such that coverplates 160A and 160B are in contact with platforms 156A and 156B, respectively. Furthermore, coverplates 160A and 160B extend over the majorities of platforms 156A and 156B, respectively.

In the illustrated embodiment, ports 164A and 164B are continuously surrounded on all sides by collar portions 161A and 161B, respectively. The flared outer ends of swage portions 166A and 166B are proximate to and larger than ports 164A and 164B, respectively, such that a small portion of swage portion 166A extends from the outer side of coverplate 160A and a small portion of swage portion 166B extends from the inner side of coverplate 160B. These small portions can be, for example, between 0.38 and 0.76 mm (0.015 and 0.030 in.) in height. The remainder of swage portions 166A and 166B extend toward the center of airfoil 158 and metering portions 168A and 168B extend from swage portions 166A and 166B and are distal from coverplates 160A and 160B, respectively. Metering portions 168A and 168B each include a plurality of metering holes for directing cooling air AC inside of body 152.

In the illustrated embodiment, baffles 162A and 162B are solely connected to coverplates 160A and 160B via baffle welds 170A and 170B, respectively, to form baffle assemblies 154A and 154B. The gaps that exist between coverplate 160A and baffle 162A are closed by melting the material from baffle 162A that extends from the outer side of collar 161A. Similarly, the gaps that exist between coverplate 160B and baffle 162B are closed by melting the material from baffle 162B that extends from the inner side of collar 161B. Thereby, collars 161A and 161B and baffle welds 170A and 170B continuously surround baffles 162A and 162B, respectively. In addition, baffle welds 170A and 170B can be substantially the same width all around a perimeter of each baffle 162A and 162B, respectively, and can penetrate completely through the joints, from outer sides to the inner sides of each of collars 161A and 161B, respectively. Such construction creates an abrupt intersection between the inner side of collar 161A and outer surface 174A of baffle 162A. Similarly, there is an abrupt intersection between the outer side of collar 161B and outer surface 174B of baffle 162B.

Furthermore, baffle assemblies 154A and 154B are solely connected to body 152 via coverplate welds 172A and 172B, respectively (although coverplate weld 172B is not visible in FIG. 3B). More specifically, baffle assembly 154A is welded to the outer side of platform 156A, and baffle assembly 154B is welded to the inner side of platform 156B (not shown). Coverplate welds 172A and 172B continuously surround coverplates 160A and 160B, respectively, and coverplate welds 172A and 172B are substantially the same width all around the perimeter of coverplates 160A and 160B. Furthermore, baffles 162A and 162B are cantilevered from collars 161A and 161B and are not directly connected to body 152.

The components and configuration of HPT stator 148 allows for cooling air $A_C$ to enter HPT stator 148 from both ends wherein there is only one baffle 162 in each baffle assembly 154. In general, the integration of a collar 161 into a coverplate 160 eliminates the redundancy that would be present in a system that has a separate stator coverplate extending over a baffle collar. Similarly to HPT stator 48, HPT stator 148 allows for a high angle transition to exist between collars 161A and 161B and baffles 162A and 162B, respectively, while permitting collars 161A and 161B to be continuous. This permits baffle welds 170A and 170B and coverplate welds 172A and 172B to be continuous and that prevents leakage of cooling air $A_C$ into cavity 159 (without first passing through one of baffles 162A and 162B). The uniform thickness and continuity of baffle welds 170A and 170B and coverplate welds 172A and 172B make the welding amenable to being performed by an automated or robotic machine.

Figure 4:
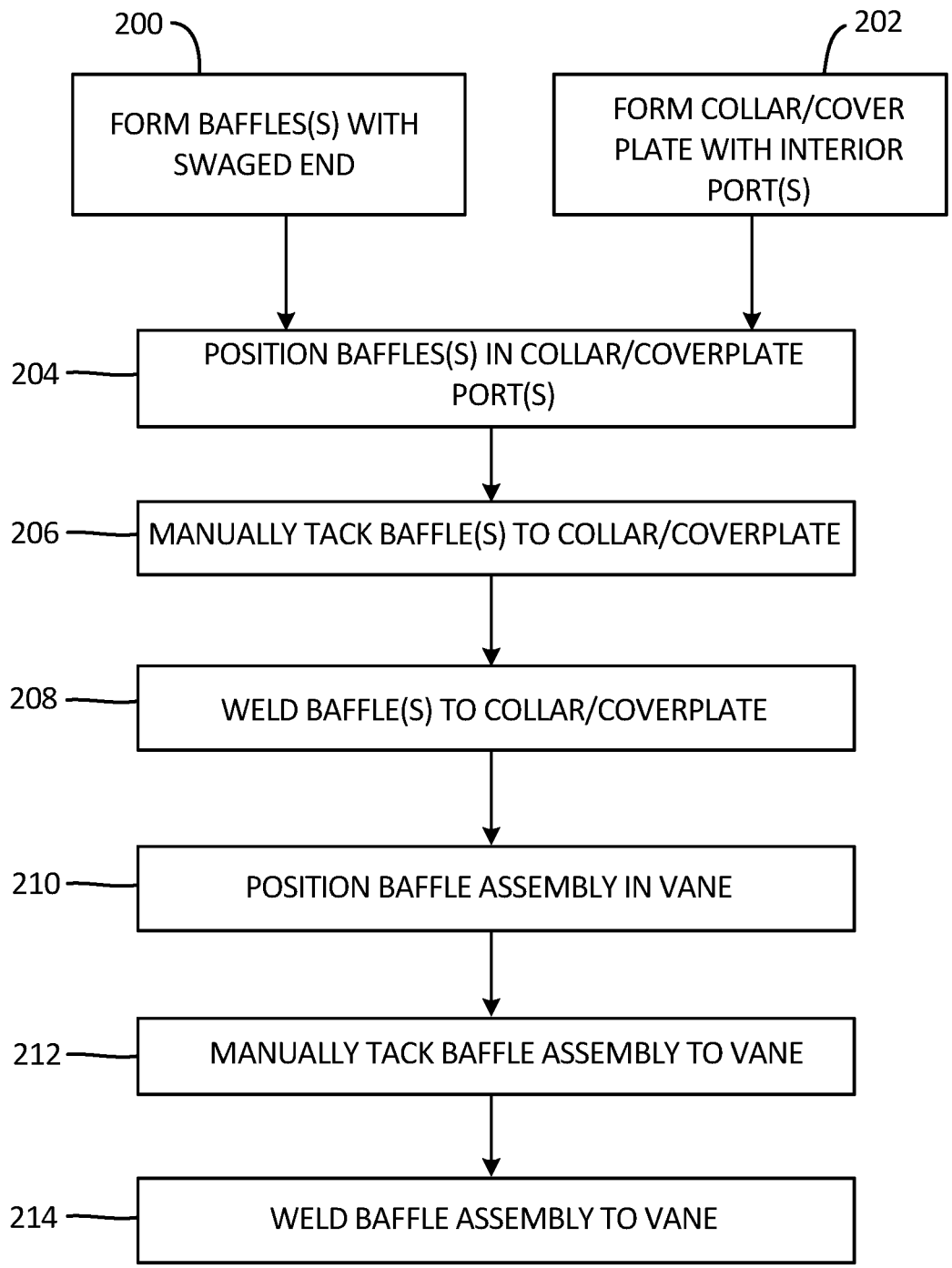
FIG. 4 is a flow chart of the assembly of the stator.

FIG. 4 is a flow chart of the assembly of either HPT stator 48 or HPT stator 148. At step 200, the baffles are formed, for example, by drawing, stamping, extruding, and/or cutting and folding. Concurrently or at another point in time, at step 202, the collar or coverplate is formed including the ports. At step 204, the baffles are positioned in the ports. At step 206, each baffle can be tack welded into place in the collar by a skilled human welder. At step 208, the perimeters of baffles are completely welded to the collar or coverplate to seal the joint between the baffles and the collar. Step 208 can be performed an automated machine that employs, for example, one of the following welding methods: laser welding, tungsten inert gas welding, electron beam welding, or plasma welding. Step 208 can be accomplished, for instance, by the automated machine moving its welding target area along a path that extends continuously around the perimeters of the baffles at a consistent pace without dwelling at any particular location (while the welding is actually taking place). In this manner, the welding is started and ended at the same location for each baffle, and the weld joint has a consistent width. Thereby, a completed baffle assembly is formed.

At step 210, the baffle assembly is positioned in a cooled component, such as a stator vane. At step 212, the baffle assembly can be tack welded into place in the cooled component by a skilled human worker. At step 214, the perimeter of baffle assembly is completely welded to the cooled component using an automated machine that employs, for example, one of the following welding methods: laser welding or electron beam welding. Step 214 can be accomplished, for instance, by the automated machine moving its welding target area along a path that extends continuously around the perimeter of the baffle assembly at a consistent pace without dwelling at any particular location (while the welding is actually taking place). In this manner, the welding is started and ended at the same location for each baffle assembly, and the weld joint has a consistent width. Thereby, a completed cooled component is formed. If the same type of welding is used to completely weld both the baffle assembly and the cooled component, then all of the automated welding can be accomplished using the same automated welding machine.

Shown in FIG. 4 is one embodiment of the present disclosure, to which there are alternatives. For example, the baffles, collar or coverplate, and cooled component can be assembled using jigs that hold the components in place during welding. In such an embodiment, steps 206 and 212 can be omitted.

Figure 5:
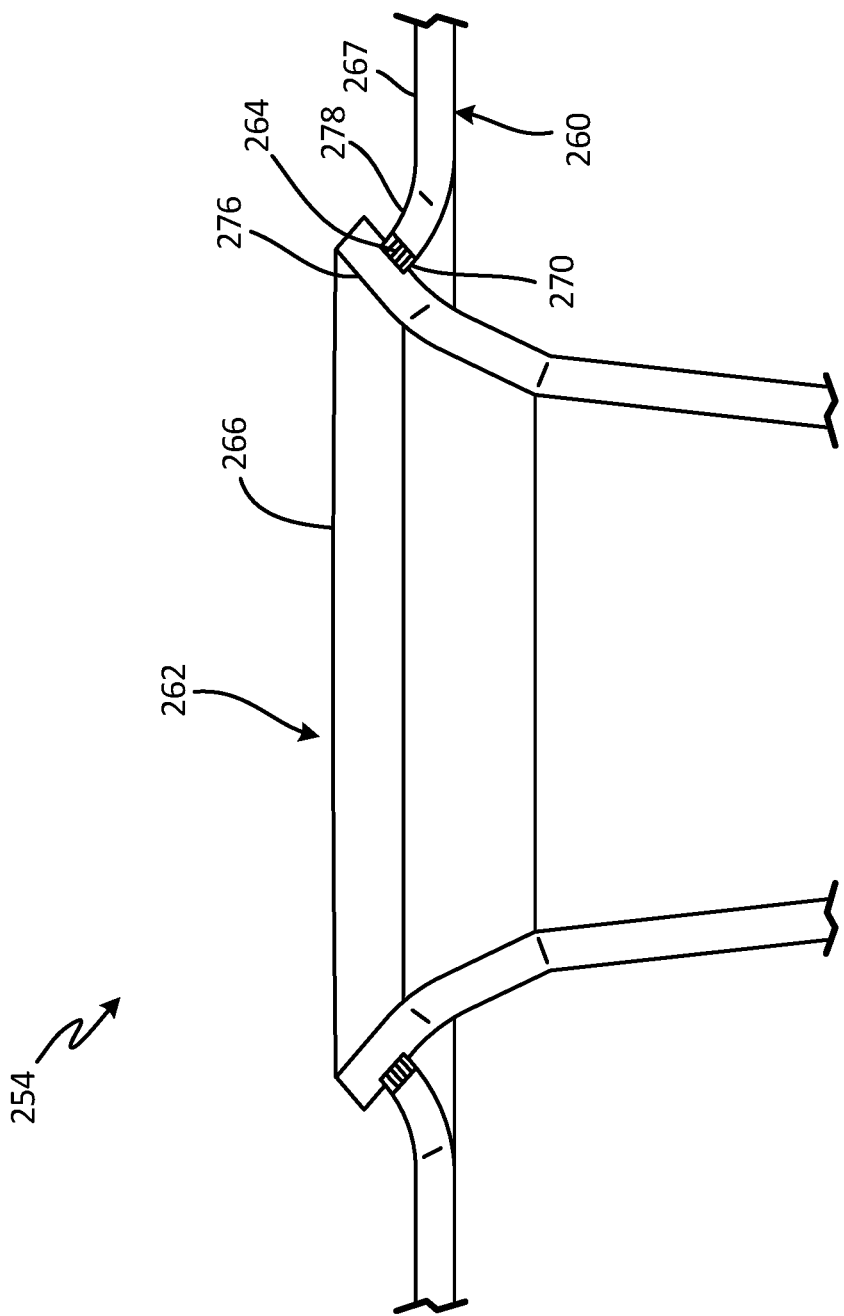
FIG. 5 is a cross-sectional view of an alternate embodiment baffle assembly.

FIG. 5 is a cross-sectional view of alternate embodiment baffle assembly 254. In the illustrated embodiment, baffle 262 includes dilated portion 276 at the end of swage portion 266. Dilated portion 276 is flared further from the flare of swage portion 266. Dilated portion 276 interfaces with raised portion 278 of collar 260. Raised portion 278 is an exception to the general flatness of collar 260, and results in port 264 being oriented outwards from outer side 267. The addition of dilated portion 276 and raised portion 278 allows for a greater tolerance difference between collar 260 and baffle 262, which ensures a proper contact area for a full-thickness baffle weld 270.

It should be recognized that the present invention provides numerous benefits and advantages. For example, when performing repetitive and repeatable welds, automated welding machines can be employed instead of skilled human workers in order to reduce production costs and possible production delays due to staffing issues.

Discussion of Possible Embodiments

The following are non-exclusive descriptions of possible embodiments of the present invention.

A baffle assembly according to an exemplary embodiment of this disclosure, among other possible things includes: a collar with a port, the collar having an inner side and an outer side; a baffle positioned in the port comprising: a first end proximate to the collar; a second end distal from the collar and positioned on the inner side of the collar; and an elongate, hollow body extending from the first end to the second end; and a weld connecting the baffle to the collar at the first end, wherein the collar continuously surrounds the body of the baffle.

The baffle assembly of the preceding paragraph can optionally include, additionally and/or alternatively, any one or more of the following features, configurations and/or additional components:

A further embodiment of the foregoing baffle assembly, wherein the first end can extend outward from the outer side of the collar.

A further embodiment of any of the foregoing baffle assemblies, wherein the collar can be integral with a coverplate, the coverplate comprising a tab that extends from the collar.

A further embodiment of any of the foregoing baffle assemblies, wherein the collar can be flat.

A further embodiment of any of the foregoing baffle assemblies, wherein the weld can extend from the outer side to the inner side of the collar.

A further embodiment of any of the foregoing baffle assemblies, wherein there can be an abrupt intersection between the inner side of the collar and an exterior of the baffle.

A further embodiment of any of the foregoing baffle assemblies, wherein the first end of the baffle can include a dialated portion that interfaces with a raised portion of the collar.

A further embodiment of any of the foregoing baffle assemblies, wherein the collar and the baffle can be each formed from sheet material of the same thickness.

A method of assembling a cooled component according to an exemplary embodiment of this disclosure, among other possible things includes: positioning a baffle in a port in a collar, wherein the collar continuously surrounds the baffle; welding the baffle to the collar by a first automated machine to form a baffle assembly; positioning the baffle assembly in the cooled component; and welding the baffle assembly to the cooled component by a second automated machine.

The method of the preceding paragraph can optionally include, additionally and/or alternatively, any one or more of the following features, configurations and/or additional components:

A further embodiment of the foregoing method, wherein welding the baffle assembly to the cooled component can comprise moving a welding target area of the second automated machine continuously around an entire perimeter of the collar at a consistent pace.

A further embodiment of any of the foregoing methods, wherein first automated machine can employ a welding process selected from the group consisting of laser welding, tungsten inert gas welding, electron beam welding, and plasma welding.

A further embodiment of any of the foregoing methods, wherein second automated machine can employ a welding process selected from the group consisting of laser welding and electron beam welding.

A further embodiment of any of the foregoing methods, wherein first automated machine can be the same as the second automated machine.

A cooled component according to an exemplary embodiment of this disclosure, among other possible things includes: an inner end; an outer end; a cavity extending into at least one of the inner and outer ends; and a first baffle assembly comprising: a first hollow baffle positioned in the cavity; and a collar welded to the first baffle that continuously surrounds the first baffle, the collar being connected to the cooled component at one of the inner and outer ends.

The cooled component of the preceding paragraph can optionally include, additionally and/or alternatively, any one or more of the following features, configurations and/or additional components:

A further embodiment of the foregoing cooled component, wherein the cooled component can be a stator vane of a gas turbine engine.

A further embodiment of any of the foregoing cooled components, wherein the first baffle assembly can include a second hollow baffle positioned in the cavity, wherein the collar is welded to the second baffle and continuously surrounds the second baffle.

A further embodiment of any of the foregoing cooled components, wherein the cooled component can include a second baffle assembly that is connected to the opposite one of the inner and outer ends from the first baffle assembly.

A further embodiment of any of the foregoing cooled components, wherein the collar can be integral with a coverplate, the coverplate comprising a tab that extends from the collar.

A further embodiment of any of the foregoing cooled components, wherein the collar can be integral with a coverplate, wherein the coverplate is welded to the cooled component, and wherein the coverplate extends over a majority of the surface of one of the inner and outer ends.

A further embodiment of any of the foregoing cooled components, wherein the baffle can be cantilevered from the collar.

A further embodiment of any of the foregoing cooled components, wherein the collar and the baffle can be each formed from sheet material of the same thickness.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A baffle assembly comprising:
a collar with a port, the collar having an inner side and an outer side, and a flared out raised portion;
a baffle positioned in the port comprising:
a first flared end proximate to the collar and larger than the port, such that a portion of the first flared end extends from the outer side of the collar wherein the first flared end of the baffle includes a dilated portion that is further flared from the first flared end and that interfaces with the flared out raised portion of the collar;
a second end distal from the collar and positioned on the inner side of the collar; and
an elongate, hollow body extending from the first end to the second end; and
a weld connecting the baffle to the collar at the first flared end, wherein the collar continuously surrounds the body of the baffle.

2. The baffle assembly of claim 1, wherein the first flared end extends outward from the outer side of the collar.

3. The baffle assembly of claim 1, wherein the collar is integral with a coverplate, the coverplate comprising a tab that extends from the collar.

4. The baffle assembly of claim 1, wherein the collar is flat.

5. The baffle assembly of claim 1, wherein the weld extends from the outer side to the inner side of the collar.

6. The baffle assembly of claim 1, wherein the collar and the baffle are each formed from sheet material of the same thickness.

7. A method of assembling a cooled component, the method comprising:
positioning a baffle having a flared end in a port in a collar, wherein the collar continuously surrounds the baffle and wherein the flared end is positioned proximate to the collar and is larger than the port, such that a portion of the flared end extends from an outer side of the collar;
welding the flared end of the baffle to the collar by a first automated machine to form a first baffle assembly;
positioning the first baffle assembly in the cooled component, the component comprising:
an inner end;
an outer end; and
a cavity extending into at least one of the inner and outer ends, wherein the first baffle assembly is positioned in the cavity;
welding the collar of the first baffle assembly to the cooled component at one of the inner and outer ends by a second automated machine,
connecting a second baffle assembly to the opposite one of the inner and outer ends from the first baffle assembly.

8. The method of claim 7, wherein welding the first baffle assembly to the cooled component comprises moving a welding target area of the second automated machine continuously around an entire perimeter of the collar at a consistent pace.

9. The method of claim 7, wherein the first automated machine employs a welding process selected from the group consisting of laser welding, tungsten inert gas welding, electron beam welding, and plasma welding.

10. The method of claim 7, wherein the second automated machine employs a welding process selected from the group consisting of laser welding and electron beam welding.

11. The method of claim 7, wherein the first automated machine is the same as the second automated machine.

12. A cooled component comprising:
   an inner end;
   an outer end;
   a cavity extending into at least one of the inner and outer ends;
   a first baffle assembly comprising:
      a first hollow baffle positioned in the cavity and having a flared end; and
      a collar that continuously surrounds the first hollow baffle such that the flared end extends from an outer side of the collar, the collar being welded to the flared end and connected to the cooled component at one of the inner and outer ends; and
   a second baffle assembly that is connected to the opposite one of the inner and outer ends from the first baffle assembly.

13. The cooled component of claim 12, wherein the cooled component is a stator vane of a gas turbine engine.

14. The cooled component of claim 12, wherein the collar is integral with a coverplate, the coverplate comprising a tab that extends from the collar.

15. The cooled component of claim 12, wherein the collar is integral with a coverplate, wherein the coverplate is welded to the cooled component, and wherein the coverplate extends over a majority of the surface of one of the inner and outer ends.

16. The cooled component of claim 12, wherein the first hollow baffle is cantilevered from the collar.

17. The cooled component of claim 12, wherein the collar and the first hollow baffle are each formed from sheet material of the same thickness.

\* \* \* \* \*